US012132907B2

(12) United States Patent
Rath et al.

(10) Patent No.: US 12,132,907 B2
(45) Date of Patent: Oct. 29, 2024

(54) DIRECTIONS FOR WIDE ANGLE INTRA PREDICTION

(71) Applicant: InterDigital Madison Patent Holdings, SAS, Paris (FR)

(72) Inventors: Gagan Rath, Bhubaneswar (IN); Fabien Racape, San Francisco, CA (US); Fabrice Urban, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/280,473

(22) PCT Filed: Sep. 25, 2019

(86) PCT No.: PCT/US2019/052863
§ 371 (c)(1),
(2) Date: Mar. 26, 2021

(87) PCT Pub. No.: WO2020/072249
PCT Pub. Date: Apr. 9, 2020

(65) Prior Publication Data
US 2022/0046244 A1    Feb. 10, 2022

(30) Foreign Application Priority Data

Oct. 1, 2018   (EP) .................................... 18290110

(51) Int. Cl.
*H04N 19/132*  (2014.01)
*H04N 19/105*  (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .. H04N 19/132; H04N 19/105; H04N 19/159; H04N 19/176
See application file for complete search history.

(56) References Cited

U.S. PATENT DOCUMENTS 9,426,491 B2   8/2016  Kim et al.
2011/0292994 A1  12/2011  Lim et al.
(Continued)

FOREIGN PATENT DOCUMENTS

GB   2591563 A   8/2021
JP   2021515491 A   6/2021
(Continued)

OTHER PUBLICATIONS

Racape et al., CE3-Related: Wide-Angle Intra Prediction for Non-Square Blocks, JVET Meeting, Jul. 11, 2018-Jul. 18, 2018; Ljubljana; (The Joint Video Exploration Team of ISO/IEC JTC1/SC29/WG11 and ITU-T SG.16), No. JVET-K0500, Jul. 16, 2018, Retrieved from the Internet: (Year: 2018).*

(Continued)

*Primary Examiner* — Hesham K Abouzahra
(74) *Attorney, Agent, or Firm* — Smadar Gefen

(57) ABSTRACT

Methods and apparatus for using wide-angle intra prediction for rectangular blocks enable greater prediction angles. Wide-angle intra prediction enables intra prediction direction angles beyond the conventional 45 and −135 degrees. In one embodiment, when a video block to be coded or decoded is non-square, additional intra prediction directions are enabled in the direction of the longer block edge and more reference samples are available along that edge. An index is used to indicate the prediction direction and can be adapted according to the additional intra predictions in the longer direction, with correspondingly fewer prediction directions along the shorter block edge. This preserves the (Continued)

(a)           (b)

number of prediction modes that need to be indexed but allows their angles to correspond to the shape of the block.

21 Claims, 9 Drawing Sheets

(51) Int. Cl.
  *H04N 19/159* (2014.01)
  *H04N 19/176* (2014.01)

(56) References Cited

U.S. PATENT DOCUMENTS

| | | | |
|---|---|---|---|
| 2018/0098064 A1 | 4/2018 | Seregin et al. | |
| 2020/0021817 A1* | 1/2020 | Van der Auwera | H04N 19/593 |
| 2021/0281835 A1* | 9/2021 | Filippov | H04N 19/182 |
| 2022/0224894 A1* | 7/2022 | Zhao | H04N 19/70 |

FOREIGN PATENT DOCUMENTS

| | | | | |
|---|---|---|---|---|
| JP | 2021520754 A | 8/2021 | | |
| KR | 101842178 B1 | 5/2018 | | |
| WO | WO2018117894 | 6/2018 | | |
| WO | WO-2018117894 A1 * | 6/2018 | | H04N 19/11 |
| WO | WO2018127624 | 7/2018 | | |
| WO | WO 2020009870 A1 | 1/2020 | | |
| WO | WO 2020060762 A1 | 3/2020 | | |

OTHER PUBLICATIONS

Sjobert et al., Description of SDR and HDR Video Coding Technology Proposal by Ericsson and Nokia, JVET Meeting, Apr. 10, 2018-Apr. 20, 2018, San Diego, The Joint Video Exploration Team of ISO/IEC JTC1/SC29/WG11 and ITU-T SG.16, URL: http://phenix.int-every.fr/jvet/, No. JVET-J0012-v2, Apr. 13, 2018.

Zhao et al., Wide Angle Intra Prediction for Versatile Video Coding, 2019 Data Compression Conference (DCC), IEEE, Mar. 26, 2019, pp. 53-62, retrieved on May 10, 2019.

Rath et al., CE-3-related: Block Shape Adaptive Intra Prediction Directions, Joint Video Experts Team (JVET) of ITU-T SG WP 3 and ISO/IEC JTC 1/SC 29/WG 11, 11th Meeting, Ljubljana, SI, Jul. 10-18, 2018, JVET-K0169_r1.

Van Der Auwera, et al., Description of Core Experiment 3 (CE3) Intra Prediction and Mode Coding, 122. MPEG Meeting, Apr. 16, 2018-Apr. 20, 2018;San Diego, Motion Picture Expert Group or ISO/IEC JTC1/SC29/WG11), No. m42829, Jun. 21, 2018, Retrieved from the Internet URL:HTTP://PHENIX.INT-EVRY.FR/mpeg/doc_end_use/documents/122_SanDiego/wg11/m42829-JVET-J102-v3-JVET-J1023r2.zip JVET-J1023r2.docx retrieved on Jun. 21, 2018 No. JVET-J1023-v2.

Racape et al., CE3-Related: Wide-Angle Intra Prediction for Non-Square Blocks, JVET Meeting, Jul. 11, 2018-Jul. 18, 2018; Ljubljana; (The Joint Video Exploration Team of ISO/IEC JTC1/SC29/WG11 and ITU-T SG.16), No. JVET-K0500, Jul. 16, 2018, Retrieved from the Internet: URL:http://phenix.int-evry.fr/jvet/doc_end_user/documents/11_Ljubljana/wg11/JVET-K0500-v6.zip JVET-0500_r4.docx.

* cited by examiner

DIRECTIONS FOR WIDE ANGLE INTRA PREDICTION

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the development of the Versatile Video Coding (VVC) standard, an increased number of intra coding modes are employed.

SUMMARY

At least one of the present embodiments generally relates to a method or an apparatus for video encoding or decoding, and more particularly, to a method or an apparatus for interaction between max transform size and transform coding tools in a video encoder or a video decoder.

According to a first aspect, there is provided a method. The method comprises steps for predicting a sample of a rectangular video block using at least one of N reference samples from a row above the rectangular video block or at least one of M reference samples from a column left of the rectangular video block, wherein said reference samples are based on a number of wide angles being increased in proportion to an aspect ratio of the rectangular block; and, encoding the rectangular video block using said prediction in an intra coding mode.

According to a second aspect, there is provided a method. The method comprises steps for predicting a sample of a rectangular video block using at least one of N reference samples from a row above the rectangular video block or at least one of M reference samples from a column left of the rectangular video block, wherein said reference samples are based on a number of wide angles being increased in proportion to an aspect ratio of the rectangular block; and, decoding the rectangular video block using said prediction in an intra coding mode.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
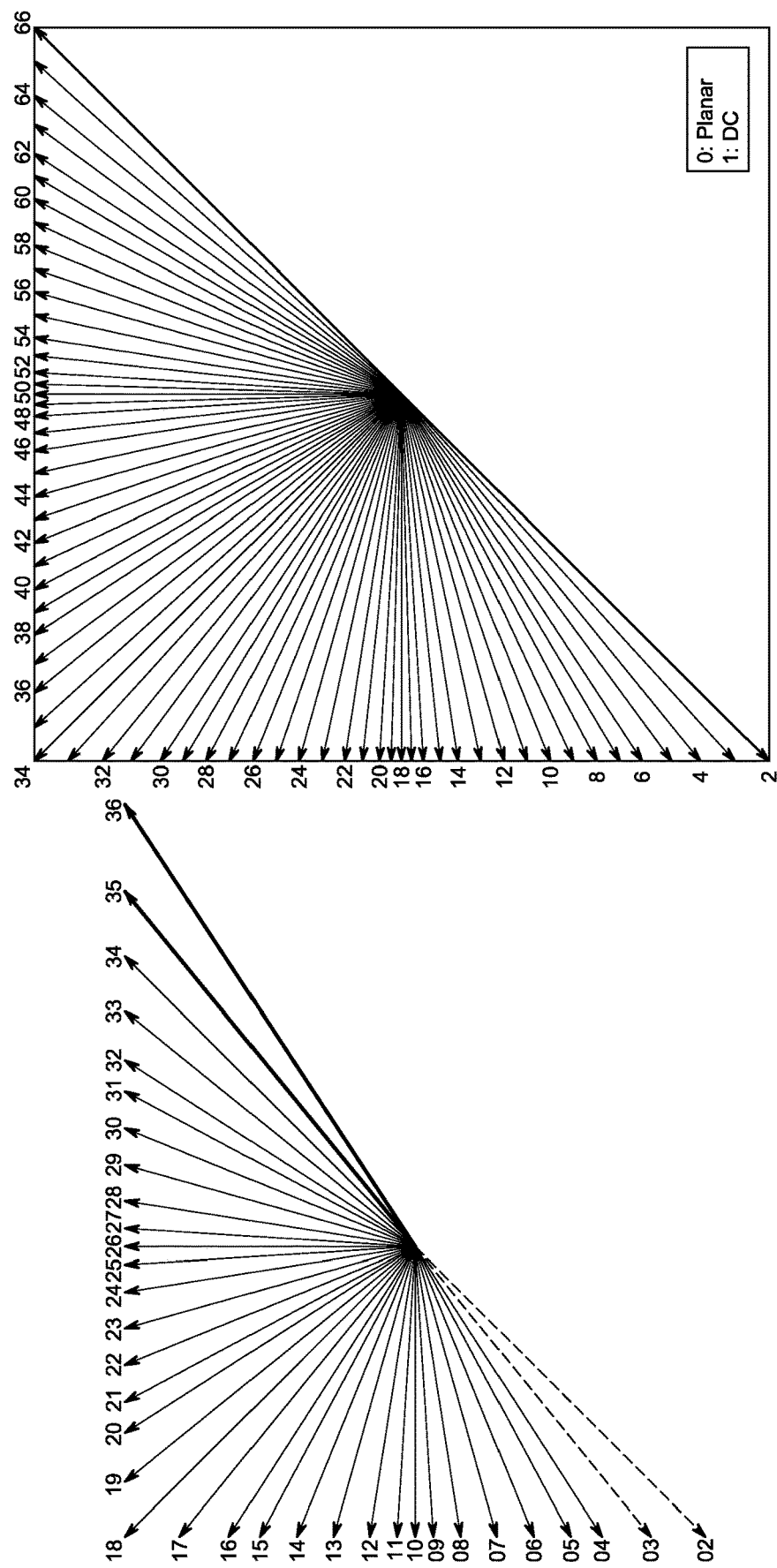
FIG. 1 shows wide angle prediction directions where (a) modes 35 and 36 replace the mode 2 and 3, respectively and (b), with 65 directions, angles are labelled from 02 to 66.

The embodiments described here are in the field of video compression and generally relate to video compression and video encoding and decoding. At least one of the present embodiments relates more specifically to video encoding and decoding related to transform coding of intra prediction residuals where the enhanced multiple transforms and/or secondary transforms are used in combination with the wide angle intra prediction.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, motion compensated temporal prediction is employed to exploit the redundancy that exists between successive pictures of a video.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples which is required to cover the aforementioned angle range for all target pixels. Considering that the height and width of a PU are of equal length, the equality of lengths of two reference arrays also makes sense.

For the next video coding standard, JVET's attempt as Joint Exploration Model (JEM) proposes to use 65 angular intra prediction modes in addition to the planar and DC modes. However, the prediction directions are defined over the same angular range, that is, from 45 degree to −135 degree in clockwise direction. For a target block of size W×H pixels, the top reference array and the left reference array are each of size (W+H+1) pixels, which is required to cover the afore-mentioned angle range for all target pixels. This definition of the angle in JEM was done more for simplicity than for any other specific reason. However, in doing so, some inefficiency was introduced. In a recent work, wide-angle intra prediction was proposed, which enable intra prediction direction angles higher than the conventional 45 degrees.

FIG. 1 shows wide angle prediction directions. Here, modes 35 and 36 replace the mode 2 and 3 respectively (a). Note that, in FIG. 1, the arrows point to the opposite direction associated with any mode. Note that on this figure, angles are labelled from 02 to 34, which correspond to angle names before the 65 prediction directions adoption in the VVC software. Now, with 65 directions (b), angles are labelled from 02 to 66.

Wide angle intra prediction (WAIP) has been adopted to be used in the upcoming Versatile Video Compression (VVC) standard, also known as H.266. WAIP refers to the usage of extra prediction directions beyond the usual 45 degree and −135 degree range used in intra prediction. When a target block is rectangular, depending on the block shape, some regular prediction directions are replaced by equal number of wide angle directions in the opposite direction. In VVC/H.266, up to 10 wide angle directions can be used, which results in 20 wide angle directions beyond the usual 45 degree to −135 degree range for prediction directions. To support these wide angle directions, the reference array lengths are suitably defined.

One problem with the adopted WAIP is that the defined wide angles are derived from the existing regular angles. The regular angles were optimized for a square block shape, but not for rectangular blocks. As a result, the defined angles for rectangular blocks are not aligned along the diagonal directions. Depending on the rectangular block shape, the diagonals may be offset from these directions by some small amount. The problem with this is that the required lengths of the reference arrays are not exactly twice the lengths of the corresponding side of the block. On the smaller side of the block, the reference array is longer than twice the length of the side. The length of the small extension is a function of the block shape. Furthermore, if the number of wide angle directions is restricted to be 10, as adopted in VVC/H.266 [1], the length of the extension can be large for rectangular blocks with aspect ratio 8, 16 and 32. In this disclosure, we provide several methods so that the extension on the smaller side is not required when the number of wide angles is not restricted to 10.

The described general aspects propose several methods to unify the design of intra prediction directions for square and rectangular blocks. It aims to use angles that suit the shape of the rectangular blocks instead of simply the angles derived from the square block case. The range of prediction directions thus spread exactly over the secondary diagonal of the target blocks. This design requires that the lengths of the reference arrays on top and left be exactly twice the length of the corresponding side of the target block. Thus, the small extension required on the smaller side is not required provided the number of wide angles is extended to 28 (14 on each side) from 20. This makes it consistent with the intra prediction without WAIP, where the total number of reference samples on top and left is equal to twice the sum of the height and width of the target block. If the number of wide angles is restricted to be 10 as adopted in VVC/H.266, the rectangular blocks with aspect ratio 8:1, 16:1 and 32:1 will still need an extension on the smaller side of the reference to support the defined prediction directions.

Wide angle intra prediction (WAIP) has been adopted to be used in the upcoming Versatile Video Compression (VVC) standard, also known as H.266. WAIP refers to the usage of extra prediction directions beyond the usual 45 degree and −135 degree range used in intra prediction. When a target block is rectangular, depending on the block shape, some regular prediction directions are replaced by equal number of wide angle directions in the opposite direction. Thus, when a target block is flat, that is, its width is larger than the height, some horizontal directions close to 45 degree are replaced by equal number of vertical directions beyond −135 degree. Similarly, when the target block is tall, that is. its height is larger than its width, some vertical directions close to −135 degree are replaced by some horizontal directions beyond 45 degree. This is illustrated in FIG. 1, where 35 angular modes are used, as in the initial version of VVC (also in HEVC). In the current version of VVC, the number of angular modes between the 45 degree and −135 degree angles has been increased to 65. Note that, in FIG. 1, the arrows point to the opposite direction associated with any mode.

In VVC/H.266, up to 10 wide angle directions can be used, which results in 20 wide angle directions beyond the usual 45 degree to −135 degree range for prediction directions. Hence the total number of angular modes used is 85 (=65+20), out of which only 65 are used for any given target block. If the target block is of square shape, the regular 65 modes between 45 degree and −135 degree are used for the prediction.

There are two problems with the current WAIP specification. The first problem results from the fact that the defined wide angles are derived from the existing angles, which were optimized for square block shapes. As a result, the prediction angles for any rectangular block are not optimized with respect to the lengths of the reference arrays, in the same sense as the original angles were for a square block. This is illustrated in FIG. 2 and FIG. 3.

Figure 2:
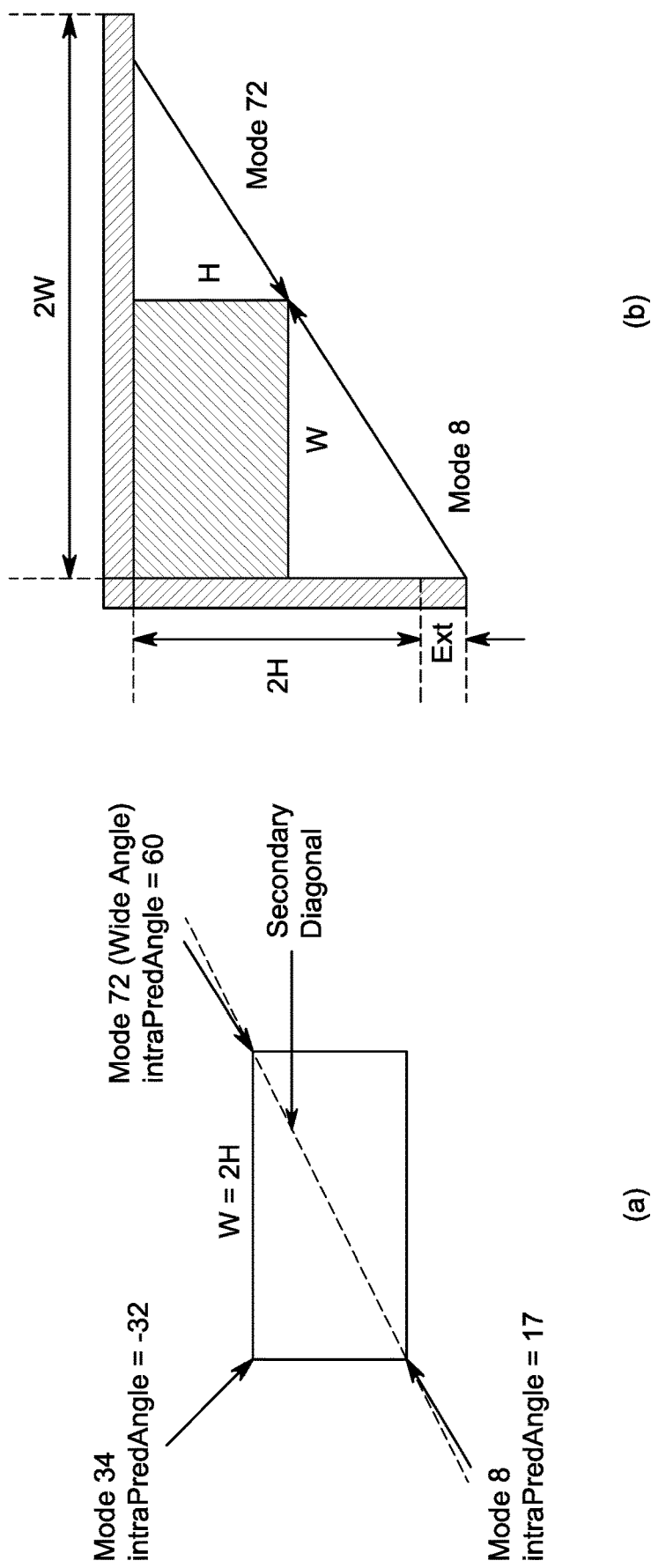
FIG. 2 shows an example of (a) a block with W=2H where the starting angle is slightly below the secondary diagonal and ending angle is slightly above it and (b) reference array on left needing small extension.

In the example of FIG. 2, W=2H. In (a) for a flat block, the starting angle (regular) is slightly below the secondary diagonal and the ending angle (wide angle) is slightly above it. In (b), the reference array on the left needs a small extension (shown as Ext).

Figure 3:
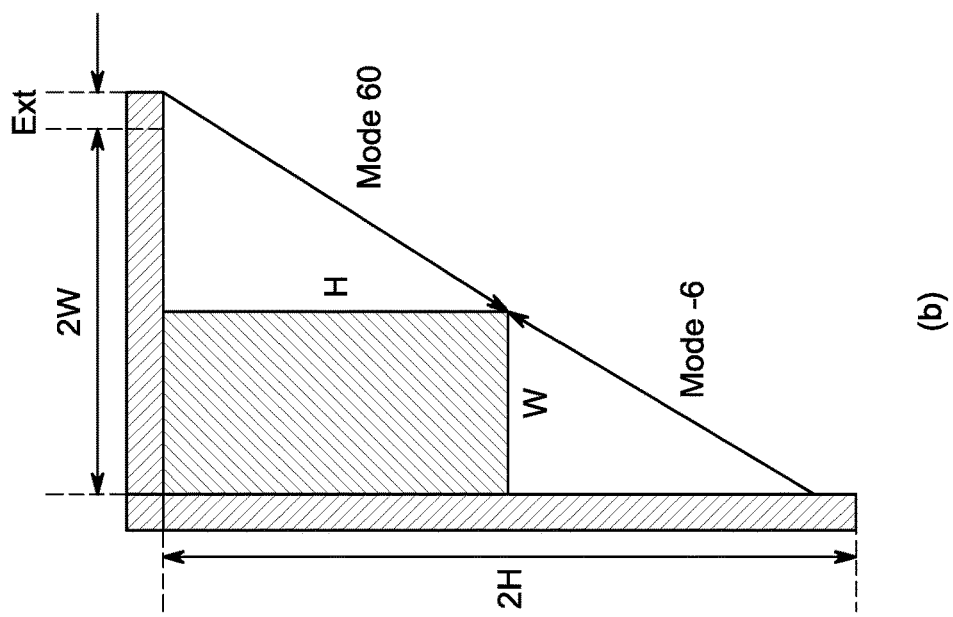
FIG. 3 shows an example of block with H=2 W and (a) the starting angle is slightly above the secondary diagonal and ending angle is slightly below it and (b) reference array on top needing small extension.
Figure 3:
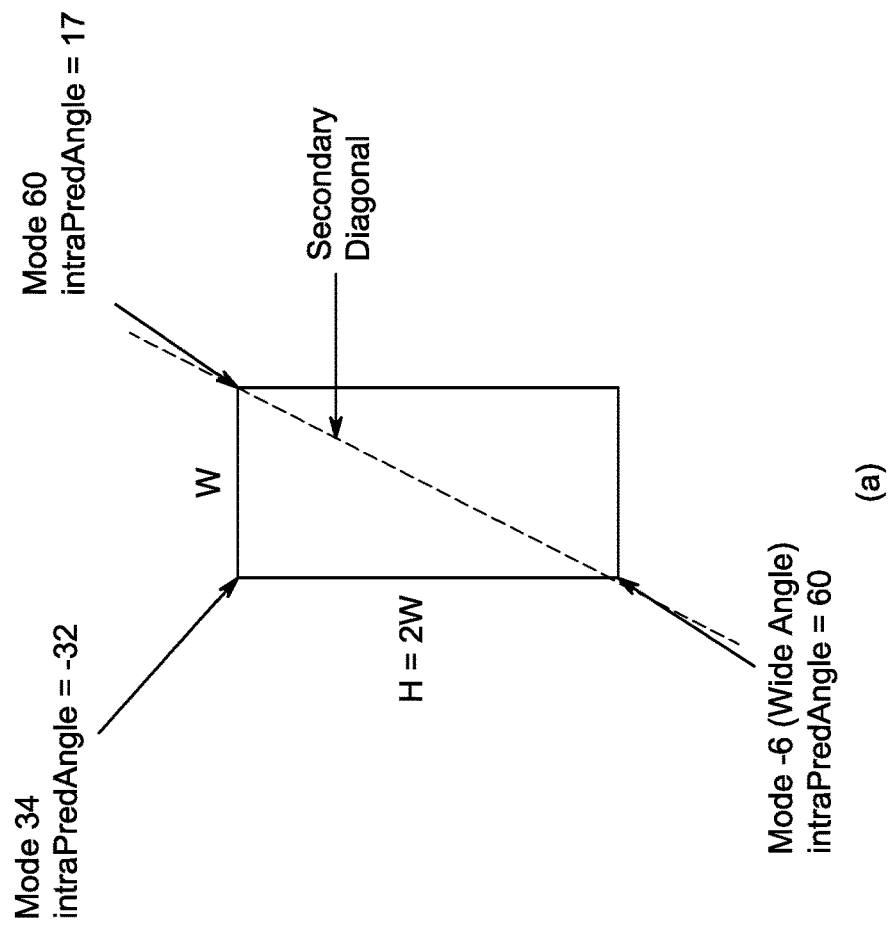

In the example of FIG. 3, H=2 W. In (a) for a tall block, the starting angle (wide angle) is slightly above the secondary diagonal and the ending angle (regular) is slightly below it. In (b) the reference array on the top needs a small extension (shown as Ext).

The starting and ending angles for a rectangular block are offset by a small amount from the secondary diagonal. For a flat rectangular block, the starting angle has intraPredAngle (also called the angle parameter A) equal to (32*H/W)+1, and the ending angle corresponds to the inverse angle having intraPredAngle equal to round(1024/((32*H/W)+1)). Similarly, for a tall rectangular block, the ending angle has intraPredAngle equal to (32*W/H)+1, and the starting angle corresponds to the inverse angle having the intraPredAngle equal to round(1024/((32*W/H)+1)). Because of this little offset from the secondary diagonal, the length of the reference array on the shorter side of the target block (without the top left corner reference sample) is slightly larger than two times the length of the side. At the same time, the reference array on the longer side, whose length is twice the side of the block (without the top left corner reference sample), contains a few redundant samples towards the end of the array as those samples are never used for any prediction mode. This makes the design of the defined prediction angles suboptimal.

The second problem with the current WAIP specification results from the restriction of the number of wide angles to 10 on each side (that is, 10 more angles beyond the standard angles). This number is optimized for a target rectangular block with aspect ratio (the ratio of the longer side to the shorter side) equal to 4:1. For such blocks, the starting and ending angles are close to the secondary diagonal, as mentioned above. But, the current VVC standard also supports rectangular blocks with aspect ratio 8:1, 16:1, and 32:1. In these cases, the starting and ending angles are significantly offset from the secondary diagonal, which in turn requires a much larger extension of the shorter reference array (beyond twice the side length), and also makes the longer reference array redundant by larger number of samples at the end, which are not used for any prediction mode. Therefore, it is proposed to extend the number of wide angles to 14 on each side which will support all rectangular blocks up to the aspect ratio 32:1. This is detailed later in the text.

The basic idea behind the wide angle prediction is to adapt the prediction directions according to the block shape while keeping the total number of prediction modes the same. This is done by adding some prediction directions on the larger side of the block and reducing the prediction directions on the shorter side. The overall aim is to improve the prediction accuracy leading to higher compression efficiency. Since the newly introduced directions are beyond the usual range of 180 degrees from 45 degree to −135 degree angle, they are termed as wide angle directions.

In this disclosure we will assume 65 intra prediction modes for a target block, which has been adopted by the current VVC standard. When the target block is square, the wide angles have no role to play since the defined modes for the block remain unchanged. When the target block is flat, that is, its width W is larger than its height H, some modes close to 45 degree are removed and an equal number of wide angle modes beyond −135 degrees are added. The added directions are indexed as prediction modes 67, 68, . . . and so on. Similarly, when the target block is tall, some modes close to −135 degree are removed and an equal number of wide angle modes beyond 45 degree are added. The added directions are indexed as prediction modes −1, −2, . . . and so on, as the prediction modes 0 and 1 are reserved for the PLANAR and DC predictions. Table 1 shows the number of regular modes replaced by wide angle modes for different block shapes. We call this parameter as modeShift.

TABLE 1

Prediction modes and modeShifts for different block shapes.

| W/H | predMode | modeShift |
|---|---|---|
| 1 | 0:66 | 0 |
| 2 | 0, 1, 8:72 | 6 |
| 4 | 0, 1, 12:76 | 10 |
| 8 | 0, 1, 12:76 | 10 |
| 16 | 0, 1, 12:76 | 10 |
| 32 | 0, 1, 12:76 | 10 |
| ½ | −6:60 | 6 |
| ¼ | −10:56 | 10 |
| ⅛ | −10:56 | 10 |

TABLE 1-continued

Prediction modes and modeShifts for different block shapes.

| W/H | predMode | modeShift |
|---|---|---|
| 1/16 | −10:56 | 10 |
| 1/32 | −10:56 | 10 |

Prediction modes #0 and #1 refer to the usual PLANAR and DC predictions.
The remaining modes are angular.
modeShift refers to the number of regular modes replaced by wide angle modes.
W/H = 1 refers to the square blocks.

For any target block, the mapping from the replaced regular mode to the wide angle mode is done as follows:

```
modeShift = (Min(2, Abs(Log2(W/H))) << 2) + 2;
if W > H and 1 < predMode < 2 + modeShift
    predMode = predMode + 65;
else if H > W and (66 − modeShift) < predMode <= 66
    predMode = predMode − 67;
```

It is clear that if we look at the prediction directions in the clockwise direction (refer to Table 1), for a flat rectangular block, the directions start with a regular mode and end with a wide angle mode. On the other hand, for a tall rectangular block, the directions start with a wide angle mode, but end with a regular mode.

The angle parameters (intraPredAngle) of the wide angles are derived from the angle parameter of the replaced regular modes as follows:

If W>H, and $A_n$ denotes the value of intraPredAngle for the replaced mode #n, the replacing wide angle mode has intraPredAngle equal to $$\text{round}\left(\frac{1024}{A_{n+1}}\right)$$

where $A_{n+1}$ denotes the intraPredAngle for the mode #(n+1). Similarly, if H>W, and $A_n$ denotes the value of intraPredAngle for the replaced mode #n, the replacing wide angle mode has intraPredAngle equal to $$\text{round}\left(\frac{1024}{A_{n-1}}\right)$$

where $A_{n-1}$ denotes the intraPredAngle for the mode #(n−1). As an example, Table 2, shows the intraPredAngle values for W/H=4.

TABLE 2

Replaced modes and the corresponding wide angle modes with their angle parameter values for W/H = 4 (flat block)

| Replaced mode | 2 | 3 | 4 | 5 | 6 | 7 | 8 | 9 | 10 | 11 |
|---|---|---|---|---|---|---|---|---|---|---|
| intraPredAngle | 32 | 29 | 26 | 23 | 21 | 19 | 17 | 15 | 13 | 11 |
| Replacing mode | 67 | 68 | 69 | 70 | 71 | 72 | 73 | 74 | 75 | 76 |
| intraPredAngle | 35 | 39 | 45 | 49 | 54 | 60 | 68 | 79 | 93 | 114 |

As another example, Table 3, shows the intraPredAngle values for W/H=1/4.

TABLE 3

Replaced modes and the corresponding wide angle modes with their angle parameter values for W/H = 1/4 (tall block)

| Replaced mode | 57 | 58 | 59 | 60 | 61 | 62 | 63 | 64 | 65 | 66 |
|---|---|---|---|---|---|---|---|---|---|---|
| intraPredAngle | 11 | 13 | 15 | 17 | 19 | 21 | 23 | 26 | 29 | 32 |
| Replacing mode | −10 | −9 | −8 | −7 | −6 | −5 | −4 | −3 | −2 | −1 |
| intraPredAngle | 114 | 93 | 79 | 68 | 60 | 54 | 49 | 45 | 39 | 35 |

In both cases, the inverse angle parameter invAngle of the new mode is given as round(8192/intraPredAngle).

To support the wide angle prediction modes, the lengths of the top and left reference arrays are obtained as follows:

```
refW = 2 * W;
refH = 2 * H;
if W > H
    refH = H + (W >> whRatio) + Ceil(W/32);
else if H > W
    refW = W + (H >> whRatio) + Ceil(H/32);
where whRatio = Min( Abs(Log2(W/H)), 2).
```

The above algorithm can be equivalently expressed as

```
refW = 2 * W;
refH = 2 * H;
if W > H,
    refH = refH + ((W >> whRatio) − H) + Ceil(W/32);
else if H > W,
    refW = refW + ((H >> whRatio) − W) + Ceil(H/32);
```

From the above determinations, it is clear that, the shorter reference array length is longer than twice the length of the side. If W>H, for example, the reference array on the left is longer than 2*H. Similarly, if H>W, the reference array on the top is longer than 2*W. The difference is a sum of two terms resulting from two different causes. The first term results from the restriction of the number of wide angles to 10 (whRatio has max value equal to 2, which corresponds to W/H>=4 or W/H<=1/4). For W/H<=4 or W/H>=1/4, the first term is equal to zero; but for W/H>4 or W/H<1/4, the first term is nonzero positive. The second term (expressed by the ceiling function) results from the fact that the starting angle (for W>H), or the ending angle (for H>W), does not align along the secondary diagonal of the block. The following described embodiments present several exemplary methods that eliminate these terms.

The first term can be made zero if there are no restrictions to the number of wide angles to 10, as it is in the current VVC standard. The number of wide angles can be increased in proportion to the aspect ratio of rectangular blocks. The number of replaced modes and corresponding wide angles for different block shapes are given in Table 4 below. It is to note that a maximum of 14 wide angles on either side (total 28 wide angles) is sufficient to cover all block sizes permitted in the current VVC standard.

TABLE 4

Proposed prediction modes and modeShifts for different block shapes.

| W/H | predMode | modeShift |
|---|---|---|
| 1 | 0:66 | 0 |
| 2 | 0, 1, 8:72 | 6 |

TABLE 4-continued

Proposed prediction modes and modeShifts for different block shapes.

| W/H | predMode | modeShift |
|---|---|---|
| 4 | 0, 1, 12:76 | 10 |
| 8 | 0, 1, 14:78 | 12 |
| 16 | 0, 1, 15:79 | 13 |
| 32 | 0, 1, 16:80 | 14 |
| ½ | −6:60 | 6 |
| ¼ | −10:56 | 10 |
| ⅛ | −12:54 | 12 |
| 1/16 | −13:53 | 13 |
| 1/32 | −14:52 | 14 |

Prediction modes #0 and #1 refer to the usual PLANAR and DC predictions.
ModeShift refers to the number of replaced modes, or equivalently, the number of added wide angle modes, for a given block shape.

The following embodiments present several example methods that aim at aligning the starting and ending prediction directions for a block along its secondary diagonal. The application of these methods will render the second term (in the expression given in the previous section) zero. Any of these methods can be thought of an example embodiment.

Method 1: Truncation

In this method, the specified prediction directions remain unchanged. For any target rectangular block, only the extreme two directions are aligned with its diagonal.

For a flat block, that is, with for W>H, the starting regular mode has the angle parameter intraPredAngle equal to (32*H/VV)+1, and the ending wide angle mode has the intraPredAngle equal to round(1024/((32*H/VV)+1)). Similarly, for a tall block, that is, for H>W, the ending regular mode has the intraPredAngle equal to (32*W/H)+1, and the starting wide angle mode has the intraPredAngle equal to round(1024/((32*W/H)+1)). The simplest manner to align these directions with the diagonal of the block is to truncate them as follows:

```
If, W > H and predMode = 2 + modeShift
    intraPredAngle = (32 * H / W)
else if, H > W and predMode = 66 − modeShift
    intraPredAngle = (32 * W / H)
```

These two statements will make the second term zero. Optionally, to align the last (first) wide angle align with the secondary diagonal of a flat (tall) block, we propose the following changes:

```
If W > H and predMode = 66 + modeShift,
    intraPredAngle = (32 * W /H)
else if H > W and predMode = −modeShift
    intraPredAngle = (32 * H / W)
```

In all cases, the inverse angle parameter invAngle is derived as invAngle=round(8132/intraPredAngle).

As examples, Table 5 (a) and Table 5(b), show the intraPredAngle values for the starting and ending directions for W/H=2 and W/H=4 respectively. The figures in red are the changes made due to truncation.

TABLE 5(a)

Angle parameter values modified by truncation for W/H = 2

| predMode | 8 | 72 |
|---|---|---|
| intraPredMode (old) | 17 | 60 |
| intraPredMode | 16 | 64 |

TABLE 5 (b)

Angle parameter values modified by truncation for W/H = 4

| predMode | 12 | 76 |
|---|---|---|
| intraPredMode (old) | 9 | 114 |
| intraPredMode | 8 | 128 |

Similarly, Table 6 (a) and Table 6(b) show the intraPredAngle values for the starting and ending directions for W/H=1/2 and W/H=1/4 respectively.

TABLE 6(a)

Angle parameter values modified by truncation for W/H = ½

| predMode | −6 | 60 |
|---|---|---|
| intraPredMode (old) | 60 | 17 |
| intraPredMode | 64 | 16 |

TABLE 6(b)

Angle parameter values modified by truncation for W/H = ¼

| predMode | −10 | 56 |
|---|---|---|
| intraPredMode (old) | 114 | 9 |
| intraPredMode | 128 | 8 |

Method 2: Dyadic Alignment

In this method, the prediction directions are changed so that the set of angle parameters, i.e. intraPredAngle, contain all the factors of 32. Correspondingly, the wide angles corresponding to them also become multiples of 32. In the process, we replace some existing intraPredAngle values. The new set of angle parameters is used for all block shapes including square blocks. As a variation, the new set can be used only for rectangular blocks. The angle values here are derived assuming that there is no restriction of number of wide angles to 10.

TABLE 7

Selected directions adjusted so as to render the angle parameter equal to factors of 32.

| intraPredAngle | 0 | 1 | 2 | 3 | 5 | 7 | 9 | 11 | 13 | 15 | 17 | 19 | 21 | 23 | 26 | 29 | 32 | 35 | 39 | 45 | 49 | 54 | 60 | 68 | 79 | 93 | 114 | 146 | 205 | 341 | 512 |
|---|---|---|---|---|---|---|---|---|---|---|---|---|---|---|---|---|---|---|---|---|---|---|---|---|---|---|---|---|---|---|---|
| Modified intraPredAngle | 0 | 1 | 2 | 3 | 4 | 7 | 8 | 10 | 13 | 15 | 16 | 19 | 21 | 23 | 26 | 29 | 32 | 35 | 39 | 45 | 49 | 54 | 64 | 68 | 79 | 93 | 128 | 146 | 256 | 341 | 512 |

Note that the modeShift values are also changed slightly since the intraPredAngle value 2 already exists. Also, for aspect ratios up to 16:1, which is the case for VVC/H.266 in an All_INTRA configuration, only 14 wide angles need to be added on either side.

TABLE 8

Modeshift values for dyadic alignment of angle parameters.

| W/H | predMode | modeShift |
|---|---|---|
| 1 | 0:66 | 0 |
| 2 | 0, 1, 8:72 | 6 |
| 4 | 0, 1, 12:76 | 10 |
| 8 | 0, 1, 14:78 | 12 |
| 16 | 0, 1, 15:79 | 14 |
| 32 | 0, 1, 16:80 | 15 |
| 1/2 | −6:60 | 6 |
| 1/4 | −10:56 | 10 |
| 1/8 | −12:54 | 12 |
| 1/16 | −13:53 | 14 |
| 1/32 | −14:52 | 15 |

Method 3: New Directions for all Block Shapes

Since the dyadic insertions of angles make the distribution of angle values somewhat irregular due to the unequal spacing of angle values, we propose to modify the other angle values so as to make the spacing somewhat uniform. Note that there is no unique way to distribute the angle since a slight change of any one value will lead to almost the same results. As a variation, the new set can be used only for rectangular blocks, and the original values, as in the standard, can be used for square target blocks. As examples, we propose the following angle values.

the top left reference sample) just need to be twice the length of the corresponding side of the block.

Figure 7:
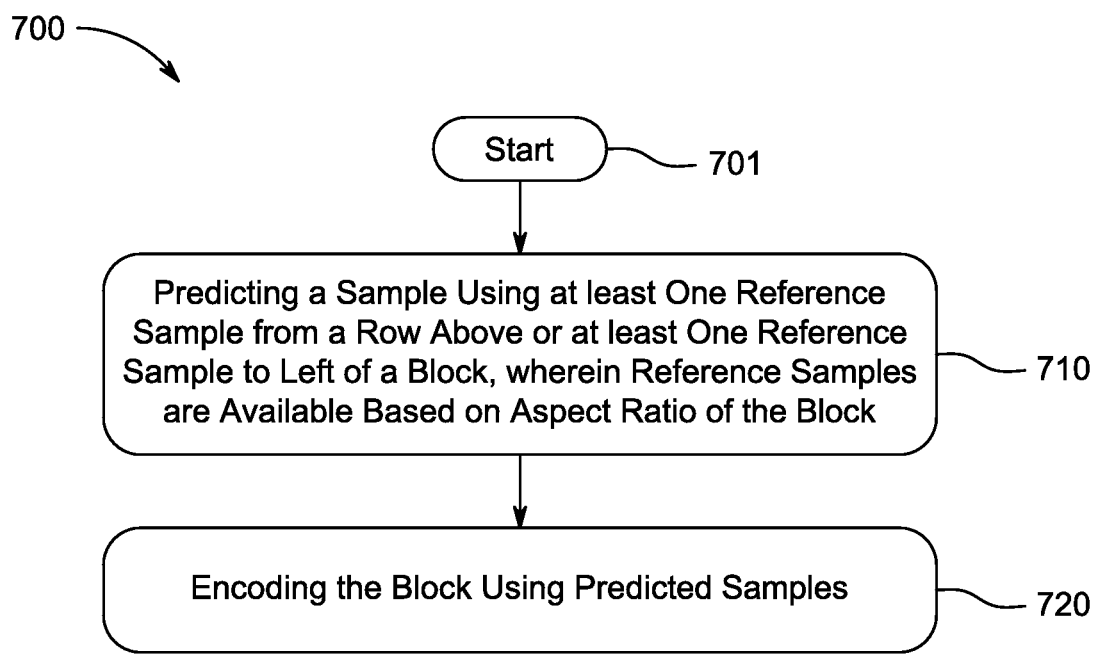
FIG. 7 shows one embodiment of a method under the described aspects.

One embodiment of a method 700 under the general aspects described here is shown in FIG. 7. The method commences at start block 701 and control proceeds to block 710 for predicting a sample of a rectangular video block using at least one of N reference samples from a row above the rectangular video block or at least one of M reference samples from a column left of the rectangular video block, wherein the reference samples are based on a number of wide angles being increased in proportion to an aspect ratio of the rectangular block. Control proceeds from block 710 to block 720 for encoding the rectangular video block using the prediction in an intra coding mode.

Figure 8:
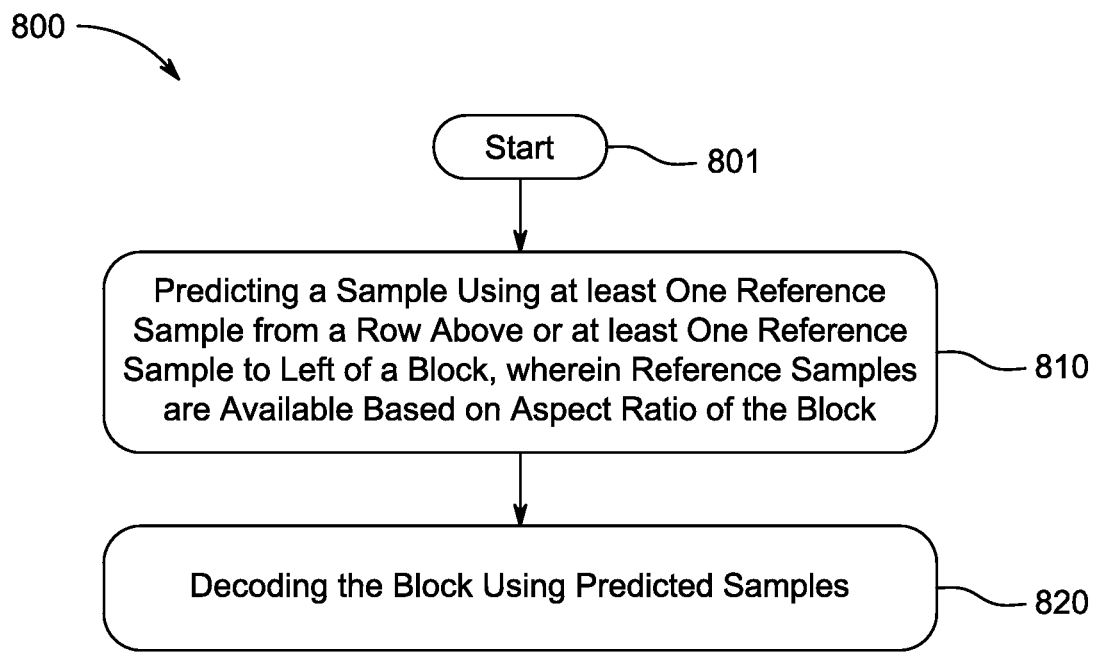
FIG. 8 shows another embodiment of a method under the described aspects.

Another embodiment of a method 800 under the general aspects described here is shown in FIG. 8. The method commences at start block 801 and control proceeds to block 810 for predicting a sample of a rectangular video block using at least one of N reference samples from a row above the rectangular video block or at least one of M reference samples from a column left of the rectangular video block, wherein the reference samples are based on a number of wide angles being increased in proportion to an aspect ratio of the rectangular block. Control proceeds from block 810 to block 820 for decoding the rectangular video block using the prediction in an intra coding mode.

Figure 9:
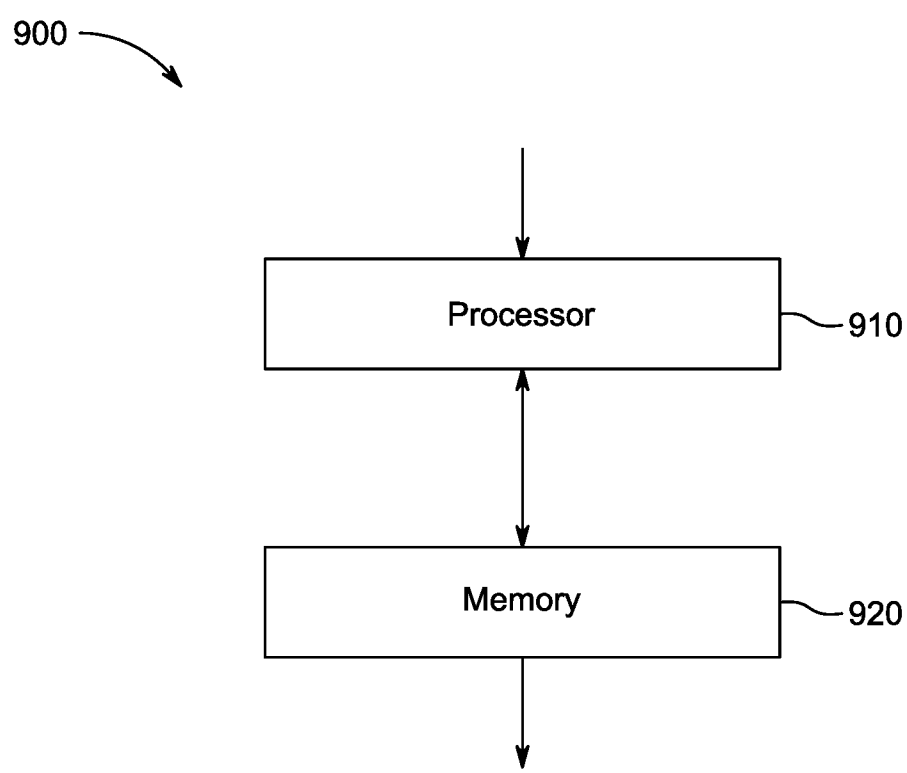
FIG. 9 shows an example apparatus under the described aspects.

FIG. 9 shows one embodiment of an apparatus 900 for encoding, decoding, compressing or decompressing video data using wide angle intra prediction. The apparatus comprises Processor 910 and can be interconnected to a memory 920 through at least one port. Both Processor 910 and TABLE 9 (a)

Example angle parameter values for WAIP. The values can be used only for rectangular blocks, or for both square and rectangular blocks.

| intraPredAngle | 0 | 1 | 2 | 3 | 5 | 7 | 9 | 11 | 13 | 15 | 17 | 19 | 21 | 23 | 26 | 29 | 32 | 35 | 39 | 45 | 49 | 54 | 60 | 68 | 79 | 93 | 114 | 146 | 205 | 341 | 512 |
| Modified intraPredAngle | 0 | 1 | 2 | 3 | 4 | 6 | 8 | 10 | 12 | 14 | 16 | 18 | 20 | 23 | 26 | 29 | 32 | 35 | 39 | 45 | 51 | 57 | 64 | 73 | 85 | 102 | 128 | 171 | 256 | 341 | 512 |

TABLE 9(b)

Example angle parameter values for WAIP. The values can be used only for rectangular blocks, or for both square and rectangular blocks.

| intraPredAngle | 0 | 1 | 2 | 3 | 5 | 7 | 9 | 11 | 13 | 15 | 17 | 19 | 21 | 23 | 26 | 29 | 32 | 35 | 39 | 45 | 49 | 54 | 60 | 68 | 79 | 93 | 114 | 146 | 205 | 341 | 512 |
| Modified intraPredAngle | 0 | 1 | 2 | 3 | 4 | 6 | 8 | 10 | 12 | 14 | 16 | 18 | 20 | 22 | 24 | 28 | 32 | 37 | 42 | 47 | 52 | 57 | 64 | 73 | 85 | 102 | 128 | 171 | 256 | 341 | 512 |

For the above examples, the modeShift values also need to be slightly changed as in Table 8.

Finally, it is also to note that, if the number of wide angles is still restricted to be 10, as it is in the VVC/H.266 code, the above methods will still render the second term zero. The first term will be zero for flat blocks with W/H<=4, or for tall blocks with W/H>=1/4. Therefore, for flat blocks with W/H>4, or for tall blocks with W/H<1/4, the shorter reference array will still require an extension beyond twice the length of the side.

One advantage of the proposed inventions is that they remove the suboptimality in the current WAIP design by aligning the prediction directions suited to the block shape. By this optimization, the reference array lengths (excluding memory 920 can also have one or more additional interconnections to external connections.

Processor 910 is also configured to either insert or receive information in a bitstream and, either compressing, encoding or decoding using any of the described aspects.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 4:
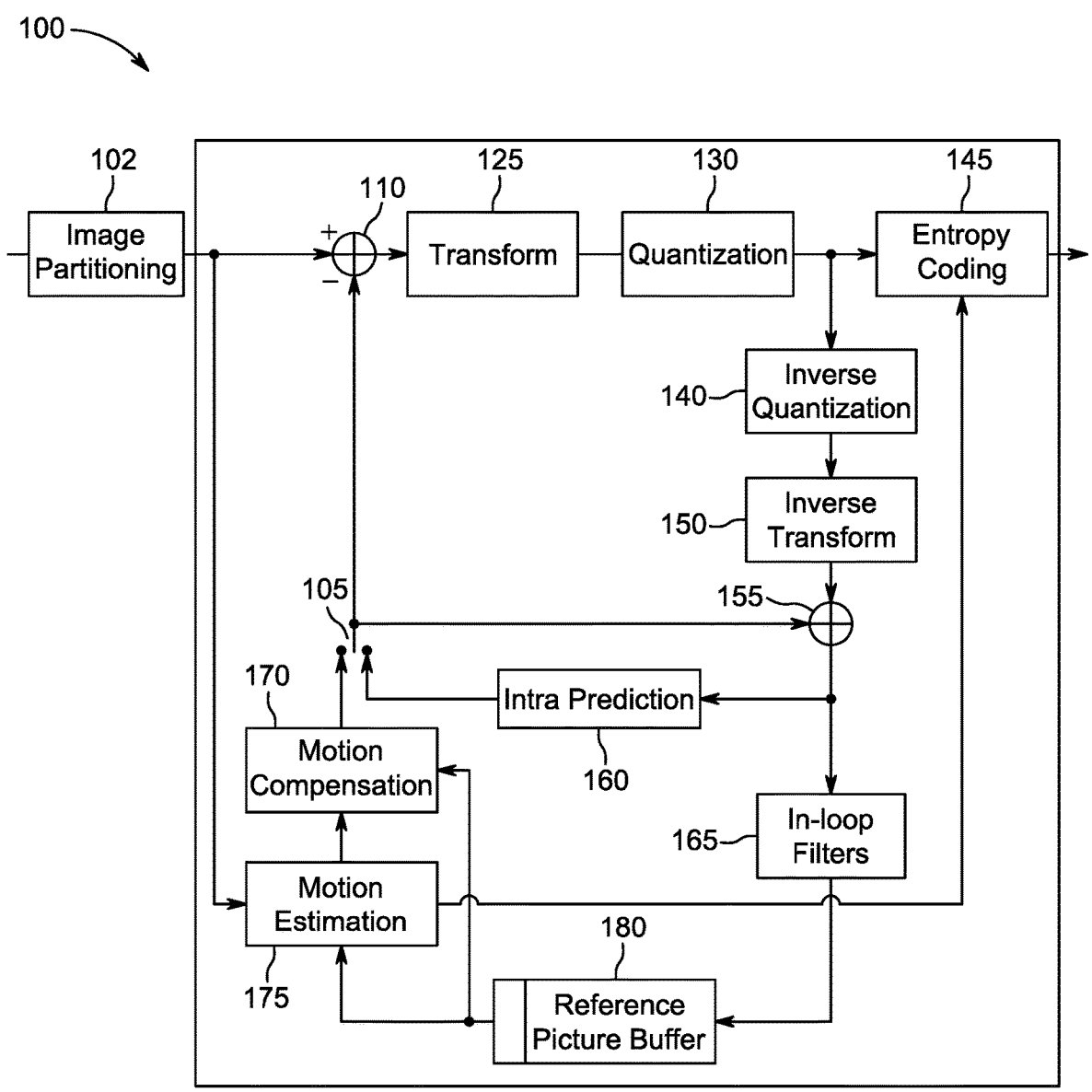
FIG. 4 shows a standard, generic video compression scheme
Figure 5:
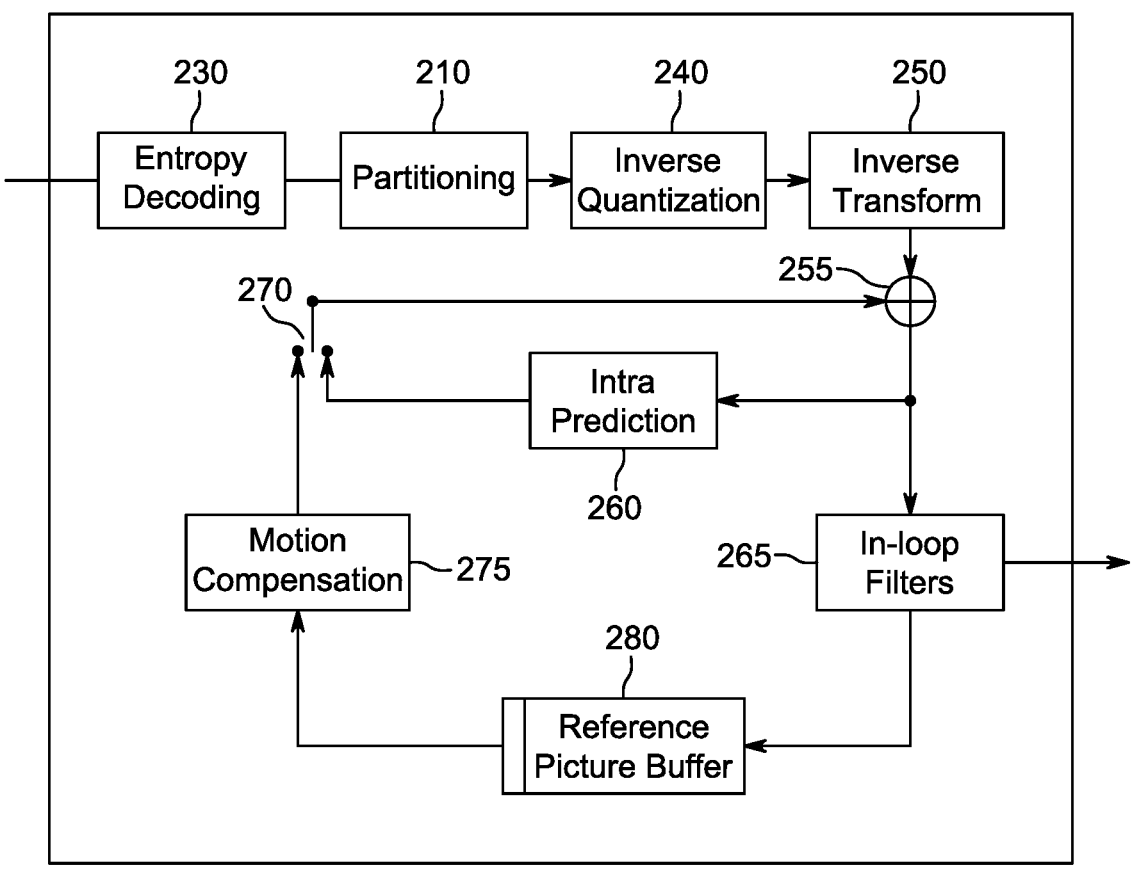
FIG. 5 shows a standard, generic video decompression scheme.
Figure 6:
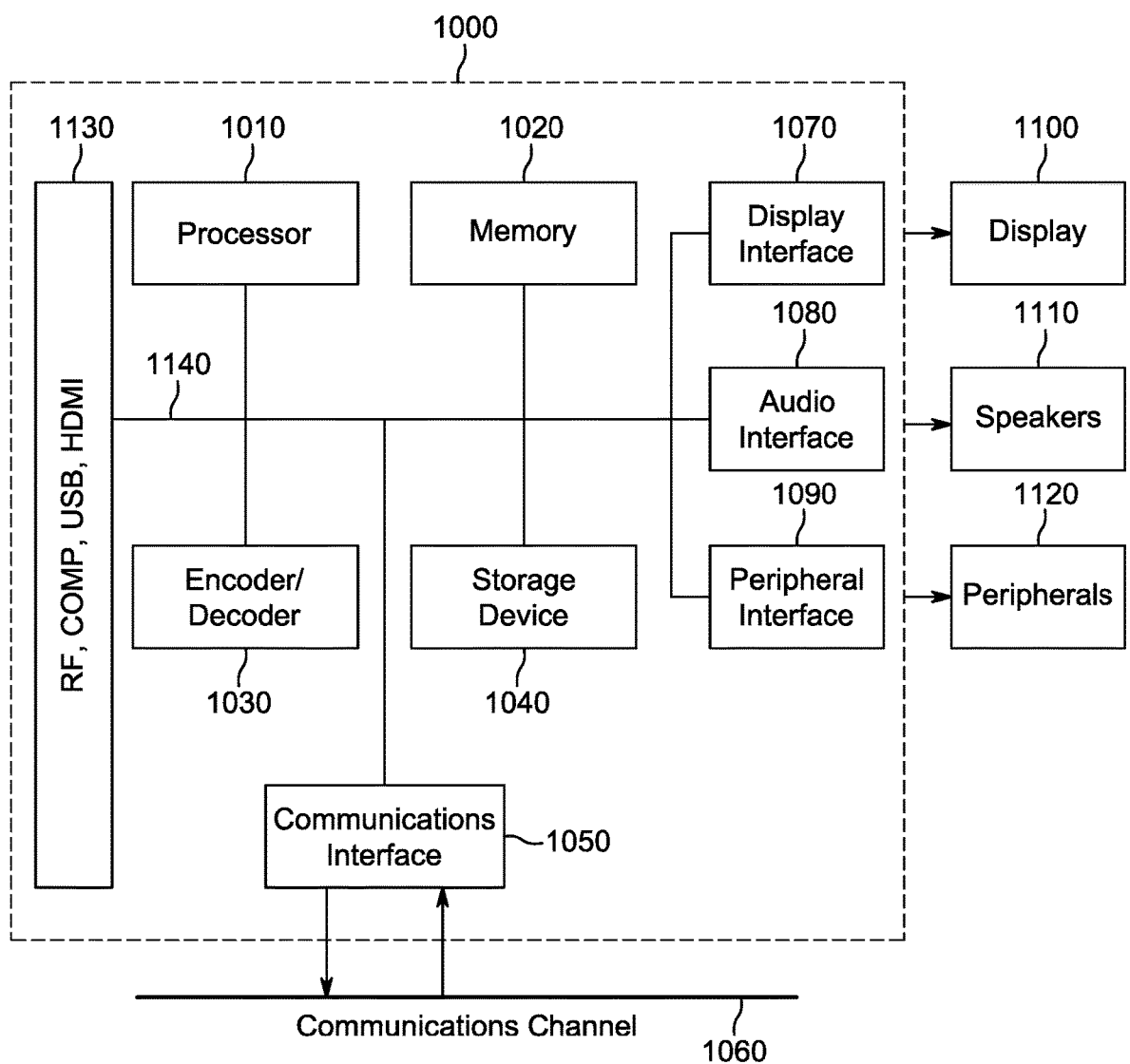
FIG. 6 shows an example processor-based subsystem for implementation of general described aspects.

The embodiments described and contemplated in this document can be implemented in many different forms. FIGS. 4, 5 and 6 below provide some embodiments, but other embodiments are contemplated and the discussion of FIGS. 4, 5 and 6 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 4 and FIG. 5. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 4 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed.

The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 5 illustrates a block diagram of a video decoder 200. In the decoder 200, a bitstream is decoded by the decoder elements as described below. Video decoder 200 generally performs a decoding pass reciprocal to the encoding pass as described in FIG. 4. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 6 illustrates a block diagram of an example of a system in which various embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various embodiments described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

Embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding description has described a number of embodiments. These and further embodiments include the following optional features alone or in any combination, across various different claim categories and types:

Using prediction directions during intra prediction in encoding and decoding beyond −135 degrees and 45 degrees extending interactions between wide-angle modes and PDPC (prediction dependent prediction combination)

extending the prediction directions in a horizontal or vertical direction while removing some directions in the opposite direction to maintain the same number of total directions extending the number of directions both beyond −135 degrees and beyond 45 degrees combining PDPC and wide angle intra prediction to samples within a block signaling from an encoder to a decoder which prediction directions are being used using a subset of prediction directions the block is a CU having a rectangular shape the reference samples are taken from a block that is a neighboring block A bitstream or signal that includes one or more of the described syntax elements, or variations thereof.

Inserting in the signaling syntax elements that enable the decoder to process a bitstream in an inverse manner as to that performed by an encoder.

Creating and/or transmitting and/or receiving and/or decoding a bitstream or signal that includes one or more of the described syntax elements, or variations thereof.

A TV, set-top box, cell phone, tablet, or other electronic device that performs any of the embodiments described.

A TV, set-top box, cell phone, tablet, or other electronic device that performs any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs any of the embodiments described.

A TV, set-top box, cell phone, tablet, or other electronic device that receives (e.g. using an antenna) a signal that includes an encoded image, and performs any of the embodiments described.

Various other generalized, as well as particularized, features are also supported and contemplated throughout this disclosure.

The invention claimed is:

1. A method, comprising:
predicting, based on a prediction mode, a sample of a rectangular video block using at least one sample of a reference array associated with the rectangular video block,
wherein the rectangular video block has a number of wide angles that is determined based on an aspect ratio of the rectangular video block,
wherein at least a starting prediction direction or an ending prediction direction, associated with the prediction mode, is aligned along a secondary diagonal of the rectangular video block, and
wherein a length of the reference array is twice the length of a corresponding side of the rectangular video block; and,
encoding the rectangular video block using the predicted sample in an intra coding mode.

2. A non-transitory computer readable medium containing data content generated according to the method of claim 1, for playback using a processor.

3. The method of claim 1, further comprising modifying one or more values of the number of wide angles to associate a distribution of the angle values with spacings of the angle values for the rectangular block.

4. The method of claim 1, wherein the reference array includes N reference samples from a row above the rectangular video block or M reference samples from a column left of the rectangular video block, wherein the value of M is different from the value of N.

5. An apparatus, comprising
a processor, configured to:
predict, based on a prediction mode, a sample of a rectangular video block using at least one sample of a reference array associated with the rectangular video block,
wherein the rectangular video block has a number of wide angles that is determined based on an aspect ratio of the rectangular video block,
wherein at least a starting prediction direction or an ending prediction direction, associated with the prediction mode, is aligned along a secondary diagonal of the rectangular video block, and
wherein a length of the reference array is twice the length of a corresponding side of the rectangular video block; and,
encode the rectangular video block using the predicted sample in an intra coding mode.

6. The apparatus of claim 5, wherein the processor is further configured to modify one or more values of the number of wide angles to associate a distribution of the angle values with spacings of the angle values for the rectangular block.

7. The apparatus of claim 5, wherein the reference array includes N reference samples from a row above the rectangular video block or M reference samples from a column left of the rectangular video block, wherein the value of M is different from the value of N.

8. A method, comprising:
predicting, based on a prediction mode, a sample of a rectangular video block using at least one sample of a reference array associated with the rectangular video block,
wherein the rectangular video block has a number of wide angles that is determined based on an aspect ratio of the rectangular block,
wherein at least a starting prediction direction or an ending prediction direction, associated with the prediction mode, is aligned along a secondary diagonal of the rectangular video block, and
wherein a length of the reference array is twice the length of a corresponding side of the rectangular block; and,
decoding the rectangular video block using the predicted sample in an intra coding mode.

9. The method of claim 8, wherein prediction directions during intra are extended beyond −135 degrees and 45 degrees.

10. The method of claim 8, wherein increasing prediction directions comprises extending the prediction directions in a horizontal or vertical direction while removing some directions in an opposite direction to maintain an equal number of total directions.

11. The method of claim 8, wherein prediction directions are restricted to a subset of extended wide angle prediction directions.

12. The method of claim 8, wherein a set of angle parameters contain factors of 32.

13. The method of claim 8, wherein said reference samples are selected from a neighboring block.

14. The method of claim 12, angle values are modified to enable uniform spacing of angles.

15. A computer program product comprising instructions which, when the program is executed by a computer, cause the computer to carry out the method of claim 8.

16. The method of claim 8, further comprising modifying one or more values of the number of wide angles to associate a distribution of the angle values with spacings of the angle values for the rectangular block.

17. The method of claim 8, wherein the reference array includes N reference samples from a row above the rectangular video block or M reference samples from a column left of the rectangular video block, wherein the value of M is different from the value of N.

18. An apparatus, comprising:
a processor, configured to:
predict, based on a prediction mode, a sample of a rectangular video block using at least one sample of a reference array associated with the rectangular video block,
wherein the rectangular video block has a number of wide angles that is determined based on an aspect ratio of the rectangular block,
wherein at least a starting prediction direction or an ending prediction direction, associated with the prediction mode, is aligned along a secondary diagonal of the rectangular video block, and
wherein a length of the reference array is twice the length of a corresponding side of the rectangular block; and,
decode the rectangular video block using the predicted sample in an intra coding mode.

19. A device comprising:
an apparatus according to claim 18; and
at least one of (i) an antenna configured to receive a signal, the signal including the video block, (ii) a band limiter configured to limit the received signal to a band of frequencies that includes the video block, and (iii) a display configured to display an output representative of a video block.

20. The apparatus of claim 18, wherein the processor is further configured to modify one or more values of the number of wide angles to associate a distribution of the angle values with spacings of the angle values for the rectangular block.

21. The apparatus of claim 18, wherein the reference array includes N reference samples from a row above the rectangular video block or M reference samples from a column left of the rectangular video block, wherein the value of M is different from the value of N.

* * * * *